United States Patent
Choi et al.

(10) Patent No.: US 11,321,630 B2
(45) Date of Patent: May 3, 2022

(54) METHOD AND APPARATUS FOR PROVIDING E-MAIL AUTHORSHIP CLASSIFICATION

(71) Applicant: AGENCY FOR DEFENSE DEVELOPMENT, Daejeon (KR)

(72) Inventors: Changhee Choi, Daejeon (KR); Hwaseong Lee, Daejeon (KR); Ilhoon Jung, Daejeon (KR); Changon Yoo, Daejeon (KR); Hosang Yun, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 791 days.

(21) Appl. No.: 16/170,779

(22) Filed: Oct. 25, 2018

(65) Prior Publication Data

US 2019/0213505 A1 Jul. 11, 2019

(30) Foreign Application Priority Data

Jan. 11, 2018 (KR) .................. 10-2018-0003723

(51) Int. Cl.
| | |
|---|---|
| *H04L 12/00* | (2006.01) |
| *G06N 20/00* | (2019.01) |
| *G06F 16/28* | (2019.01) |
| *G06F 16/35* | (2019.01) |
| *H04L 29/06* | (2006.01) |
| *G06F 16/2457* | (2019.01) |
| *G06Q 50/32* | (2012.01) |

(52) U.S. Cl.
CPC ........... *G06N 20/00* (2019.01); *G06F 16/285* (2019.01); *G06F 16/355* (2019.01); *H04L 63/1425* (2013.01); *H04L 63/1483* (2013.01); *G06F 16/2457* (2019.01); *G06Q 50/32* (2013.01)

(58) Field of Classification Search
CPC ............. H04L 63/1425; H04L 63/1483; G06F 16/285; G06F 16/2457; G06F 16/355; G06Q 50/32; G06N 20/00
USPC ............... 726/22; 709/206; 706/12; 715/752
See application file for complete search history.

(56) References Cited

U.S. PATENT DOCUMENTS

| | | | |
|---|---|---|---|
| 7,051,075 B1 * | 5/2006 | Machino .............. | G06Q 10/107 709/206 |
| 8,204,838 B2 * | 6/2012 | Schwaighofer ...... | G06K 9/6226 706/12 |

(Continued)

FOREIGN PATENT DOCUMENTS

| | | |
|---|---|---|
| KR | 10-2003-0055817 | 7/2003 |
| KR | 10-2013-0026099 | 3/2013 |
| KR | 10-2017-0005279 | 1/2017 |

*Primary Examiner* — Frantz Coby
(74) *Attorney, Agent, or Firm* — Fenwick & West LLP

(57) ABSTRACT

There is provided an email authorship classification apparatus. The apparatus includes an information analysis unit configured to analyze header field information in an attribute header of each of emails and extract feature field information related to an authorship of each of the emails from each of the header field information and an information conversion unit configured to convert the feature field information into a feature data set for inputting a learning model thereto. The apparatus further includes a learning model unit configured to generate a classification model for classifying the emails by author by applying a learning process to the feature data set.

13 Claims, 5 Drawing Sheets

(56) References Cited

U.S. PATENT DOCUMENTS

| | | | |
|---|---|---|---|
| 8,738,721 B1* | 5/2014 | Smirnov | G06Q 10/107 709/206 |
| 10,810,317 B2* | 10/2020 | Williamson | G06N 20/00 |
| 2003/0018727 A1* | 1/2003 | Yamamoto | H04L 51/14 709/206 |
| 2004/0215977 A1* | 10/2004 | Goodman | H04L 51/12 726/22 |
| 2008/0109736 A1* | 5/2008 | Itoh | H04L 51/28 715/752 |
| 2008/0133669 A1* | 6/2008 | Ge | H04L 51/28 709/206 |
| 2017/0093771 A1* | 3/2017 | Gatti | H04L 51/28 |
| 2019/0213505 A1* | 7/2019 | Choi | H04L 63/1425 |

* cited by examiner

FIG.2

| FEATURE CLASSIFICATION FIELD (24) | FEATURE FIELD (22) | FEATURE TYPE (26) | RANGE (28) | HEADER FIELD (20) |
|---|---|---|---|---|
| Location | Country | Categorical | - | IP |
| Location | Latitude | Numerical | -90~+90 | IP |
| Location | Longitude | Numerical | -180~+180 | IP |
| Location | Time zone(IP) | Numerical | -12~+14 | IP |
| Location | Time zone(Recv.) | Numerical | -12~+14 | Received |
| Location | Time zone(Date) | Numerical | -12~+14 | Date |
| Language | Encoding | Categorical | - | Content-Transfer-Encoding |
| Language | Accept-Language | Categorical | - | Accept-Language |
| Language | Content-Language | Categorical | - | Content-Language |
| Language | Charset(From) | Categorical | - | From |
| Language | Charset(Subject) | Categorical | - | Subject |
| Language | Charset(Recv.) | Categorical | - | Receiced |
| Time | Date | Numerical | 0~INF | Date |
| Time | Weekday/Weekend | Categorical | 2 | Date |
| Time | Business hours | Categorical | 2 | Date |
| Time | Shift type | Categorical | 6 | Date |

FIG.3

| Morning | 08:00~11:59 | Dinner | 19:00~19:59 |
|---|---|---|---|
| Lunch | 12:00~12:59 | Night | 20:00~23:59 |
| Afternoon | 13:59~18:59 | Graveyard | 00:00~07::59 |

FIG.4

| Weekday | Mon., Tue., Wed., Thu., Fri. |
|---|---|
| Weekend | Sat., Sun. |

FIG.5

| Business hours | 08:00~18:59 |
|---|---|
| Non-Business hours | 19:00~07:59 |

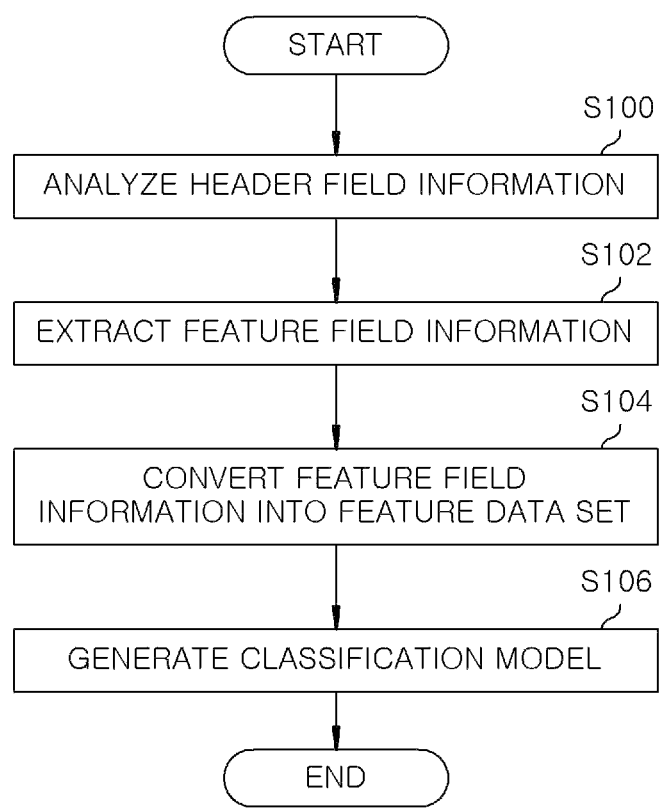

METHOD AND APPARATUS FOR PROVIDING E-MAIL AUTHORSHIP CLASSIFICATION

CROSS-REFERENCE TO RELATED APPLICATION

This application claims priority to Republic of Korea Patent Application No. 10-2018-0003723, filed on Jan. 11, 2018, the entire contents of which is incorporated herein by reference.

TECHNICAL FIELD

The present disclosure relates to a method and apparatus for providing email authorship classification.

BACKGROUND

Conventional email classification methods classify the nature or author of an email by mainly utilizing general data mining features.

These kinds of methods suffer from the disadvantage of requiring a security expert to manually analyze each email header, making it difficult to maintain objectivity and efficiency in the analysis. Further, the data mining techniques are applied only to the email body, limiting the environment to which the classification methods are applied.

Patent document 1: Korean Patent Application Publication No. 10-2005-0111566 (published on Nov. 25, 2005)

SUMMARY

In view of the above, embodiments of the present disclosure provide a method and an apparatus for providing email authorship classification that are capable of rapid analysis of an email by analyzing the header of an email to classify a sender (an author) thereof.

Further, the method and apparatus for providing email authorship classification according to the embodiments of the present disclosure are also capable of classifying the author of the email efficiently even when the number of given emails is small or the types of feature information are diverse. This is achieved by extracting the feature information, through which the author of the email can be identified, from the header of the email and applying a classification learning algorithm to the feature information.

It is to be understood, however, that the object of the present disclosure is not limited to those mentioned above. Other objects not mentioned above will be clearly understood by those skilled in the art from the following description.

In accordance with an aspect of the present disclosure, there is provided an email authorship classification apparatus including: an information analysis unit configured to analyze one or more pieces of header field information in an attribute header of each of emails and extract one or more pieces of feature field information related to an authorship of each of the emails from each of the one or more pieces of header field information; an information conversion unit configured to convert the one or more pieces of the feature field information into a feature data set for inputting into a learning model thereto; and a learning model unit configured to generate a classification model for classifying the emails by author by applying a learning process to the feature data set.

Further, the information analysis unit may classify the one or more pieces of feature field information into location information, language information, time information, and system information.

Further, the information conversion unit may convert the one or more pieces of feature field information into categorical data or numerical data to generate the feature data set.

Further, the location information may be classified into at least one of country, latitude, longitude, and time zone; the language information may be classified into at least one of encoding, accept-language, content-language, and charset; and the time information may be classified into at least one of date, weekday/weekend, business hours, and shift type.

Further, the learning model unit may include a sampling unit configured to divide the feature data set into 'n' groups of samples; a learning and classifying unit configured to generate 'n' number of classifiers by applying a learning algorithm to each of the 'n' groups of samples; and a model combining unit configured to combine the 'n' number of classifiers to generate a classification model.

Further, the learning algorithm may include a bagging classification algorithm.

Further, the email authorship classification apparatus described above may further include an author classification unit configured to classify an author of a specific email by applying the classification model of the learning model unit to the specific email.

In accordance with another aspect of the present disclosure, there is provided a learning method of a learning apparatus for email authorship classification, the method including: analyzing one or more pieces of header field information in an attribute header of each of emails; extracting one or more pieces of feature field information related to an authorship of each of the emails from each of the one or more pieces of header field information; converting the one or more pieces of the feature field information into a feature data set for inputting into a learning model thereto; and generating a classification model for classifying the emails by author by applying a learning process to the feature data set.

According to aspects of the present disclosure, it is possible to automatically classify a large number of advanced persistent threat (APT) attacks by author, so that attack groups can be analyzed in a short period of time. Further, there is also the possibility that security experts may discover unrecognized results through machine learning or the like.

BRIEF DESCRIPTION OF THE DRAWINGS

FIGS. 2 to 5 show a field information table for email authorship classification according to one embodiment of the present disclosure.

FIG. 7 is a flowchart illustrating an exemplary learning method for email authorship classification according to one embodiment of the present disclosure.

DETAILED DESCRIPTION

Figure 1:
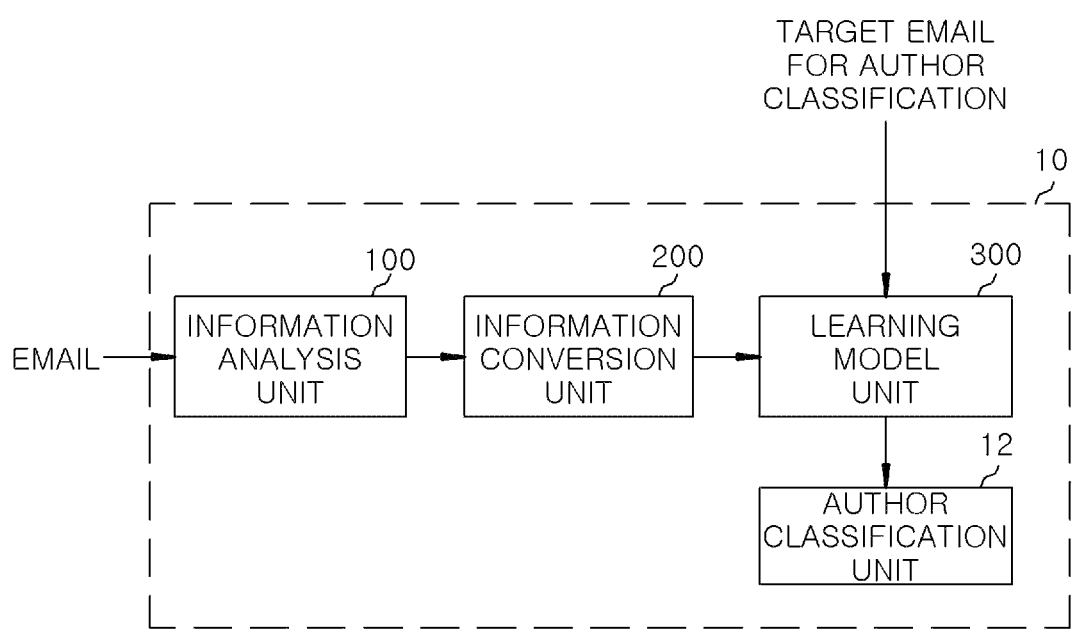
FIG. 1 is a block diagram of a learning apparatus for email authorship classification according to one embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that the detailed description of related known components or functions unnecessarily obscures the gist of the present disclosure, the detailed description thereof will be omitted. Further, the terminologies to be described below are defined in consideration of the functions of the embodiments of the present disclosure and may vary depending on a user's or an operator's intention or practice. Accordingly, the definition thereof may be made on a basis of the content throughout the specification.

Recently, top level advanced persistent threat (APT) attacks that are seemingly carried out with support from government agencies have increased. APT attackers often use spear phishing, with email as initial attack vectors. APT attackers investigate targets over a long period of time and utilize social engineering techniques based thereon, making it difficult for the targets to distinguish between normal emails and phishing emails. In particular, emails using personal information of the targets are less likely to be filtered as spam mails, making it more difficult for the targets to determine the presence of phishing emails.

Unlike physical attacks, evidence of cyber-attacks can be easily erased by anti-forensic technology. By using such technology, attackers make many efforts to destroy the source information related to their identity, and may also plant erroneous information to cause confusion. Furthermore, as top level APT attacks have expanded into cyberspace, the number of security experts for analyzing such attacks has been significantly insufficient.

Conventionally, the majority of the research for solving this issue has been reliant on security experts manually analyzing the emails used in the APT attacks. For instance, there was proposed a research analyzing email headers by using a forensics approach. This research team analyzed the 'received' field to extract the order and information about mail user agents (MUA) and mail transport agents (MTA). Through this analysis, it was possible to identify the approximate addresses of the email senders and the email delivery paths. This research team also analyzed the 'message-ID' field to obtain information about the email client. This analysis is based on the fact that the message-ID in the email is unique to the type and version of the email client that was used to send the email, such as Outlook, Thunderbird or the like. Further, there was also proposed a research focusing on author profiling and analyzing email headers by classifying fields that can indicate features of authors such as region, language, time, and system. As in the above-described researches, while it is possible to analyze the fields contained in the email headers to infer information about the authors, there is a disadvantage that the analysis requires security experts to manually analyze the fields.

Additional research of one research team suggested a method for classifying an author as spam email. The method suggested distinguishing spam mail by applying an N-gram unsupervised automated natural cluster ensemble (NUANCE) to the headers and texts of emails. Further, another research team constructed a database from personal email data. They extracted features from N-gram, word similarity and the like, and utilized these features as data for classification and clustering algorithms. Further, another research team applied data mining techniques to the text of the email. They derived stylistic features from the text and applied the classification algorithms to these features. The classification by multiple association rule for authorship attribution (CMARAA) that they introduced achieved high accuracy in classifying the authors. Other research team extracted 419 feature sets reflecting lexical, syntactic, structural and domain-specific features from the text of the email bodies and applied three clustering algorithms.

The above-described researches and studies focused on classification rather than specification of the author, and the features therein were only used to classify the nature of the email, such as spam email classification, advertising emails, and promotions. Further, most of the researches applied data mining techniques only to the text of the email bodies.

The embodiments of the present disclosure provide an email authorship classification technique capable of rapid analysis of an email by analyzing the header of an email to classify the sender (the author) thereof. In particular, the embodiments of the present disclosure provide an email authorship classification technique capable of classifying the author of the email efficiently even when the number of given emails is small or there are various pieces of feature information. This is achieved by extracting the feature information, through which the author of the email can be identified, from the header of the email and applying a classification learning algorithm to the feature information.

Hereinafter, the embodiments of the present disclosure will be described in detail with reference to the accompanying drawings.

FIG. 1 is a block diagram of a learning apparatus for email authorship classification according to one embodiment of the present disclosure.

An email authorship classification apparatus 10 of FIG. 1 may include an information analysis unit 100, an information conversion unit 200, and a learning model unit 300, and may further include an author classification unit 12, if necessary.

As shown in FIG. 1, the information analysis unit 100 receives an attribute header of an email and is configured to analyze one or more pieces of header field information in the attribute header.

Further, the information analysis unit 100 is configured to extract one or more pieces of feature field information related to the authorship of the email from each of the one or more pieces of header field information.

Moreover, the information analysis unit 100 is configured to classify the feature field information into feature classification field information including, e.g., location information, language information, time information, system information and the like.

FIG. 2 shows the header field information, the feature field information, and the feature classification field information described above.

As shown in FIG. 2, the header field information can be found by analyzing an attribute header of an email, and is tabulated in the header field 20. The header field information tabulated in the header field 20 may include, e.g., 'IP', 'Received', 'Date', 'Content-Transfer-Encoding', 'Accept-Language', 'Content-Language', 'From', and 'Subject' fields.

Further, the feature field information, which is related to the authorship of the email and extracted from the header field information, may be tabulated in the feature field 22. The feature field information may include, e.g., 'Country', 'Latitude', 'Longitude', 'Time zone (IP)', 'Time zone (Recv.)', 'Time zone(Date)', 'Encoding', 'Accept-Language', 'Content-Language', 'Charset(From)', 'Charset (Subject)', 'Charset(Recv.)', 'Date', 'Weekday/Weekend', 'Business hours', and 'Shift type' fields.

The above described feature field information may be classified into location information, language information, time information, and system information, and tabulated in the feature classification field 24.

The location information of the author is key information for identifying an attacker group. The location information can be extracted from the 'Received' field, the 'A-Received' field, and the 'Date' field. The sender's IP address can be extracted from the 'Received' field, the 'X-Received' field, the 'X-Originating-IP' field, and the 'X-ClientIP' field. Information in the 'Received' field are logged in order from bottom to top as the email is delivered, and the bottom one is closest to the sender's IP address. Therefore, the IP address is searched in reverse order, and if there are no IP addresses logged in the 'Received' field, the IP address can be searched in other fields.

However, IP addresses are not suitable for use in classification algorithms. It is difficult to use IP addresses as a continuous type variable since IP addresses are not continuously distributed according to the location. Further, it is also difficult to use IP addresses as a categorical type variable since the mapping between the location and IP address changes frequently. In addition, because there are about 4.3 billion IP addresses, computation of categorical type variables using IP addresses would be almost impossible.

In order to solve such a problem, in the present embodiment, the feature field information such as country, city, latitude, longitude, and time zone are extracted from an IP address and are selected as features. In 2017, the available number of countries is 195, and thus country can be used as a categorical type variable. The location information may be used when there are a large number of emails to be applied to the learning, but otherwise, location information is best avoided due to computational inefficiency and overfitting.

The time zone information includes the time zone of a specific country, which can identify the country on the basis of longitude. In particular, when installing an operating system or a program in a system, it is necessary to select the time zone and, in some cases, the time zone is automatically inputted depending on the region where the program is purchased. For example, when the Korean version of the Windows operating system is purchased and installed, the time zone of Seoul is set by default. While time zone information may be extracted from the IP address, it is basically included in the 'Received' field. Time zone information is information that can be useful as both continuous and categorical type variables.

The language information may reflect the background of the sender (i.e., the author). Security experts consider language information as one of the most valuable types of information. Language information can be extracted from the 'Content-Type' field, the 'Encoding' field, the 'Accept-Language' field, the 'From' field, the 'To' field, the 'Subject' field, and the like. The setting and language being used may indicate the country or the region where the sender is from, but may instead indicate the language of the target rather than the language of the sender. This is because APT attackers regularly set the language to the target's language in order to simulate the target's environment as closely as possible. In addition, in order to make use of social engineering techniques, fluency in the target's language is required for the attackers to easily persuade and deceive the target.

While the 'Content-Type' field contains various pieces of information, information contained in the 'Charset' field, which is a sub-field of the 'Content-Type' field, is very helpful for achieving the purpose of the present disclosure. This information in the 'Charset' field refers to the user's language (e.g., us-ascii) used in the text. For some languages, a country-specific keyboard needs to be used for the user to input text in the particular language. In this case, a keyboard layout can be inferred conversely by the information in the 'Charset' field, which also makes it possible to infer the country. According to RFC 2978, there are currently 257 charsets in common use. While the 'Charset' field is an assignment set between a character and a code, the 'Encoding' field is a regulation used for transmitting or storing the assigned code. The information in the 'Encoding' field can also be valuable trace information used to infer the user's environment.

The 'Content-Language' field is present in the hypertext transfer protocol (HTTP) header and represents the set of languages in which the content can be presented. The 'Accept-Language' field is the response of the 'Content-Language' field, indicating the acceptable languages for the author. This field also indicates the language that the email sender primarily uses. It is not common in regions primarily using English, but there are cases where languages other than English are used to represent the sender, the receiver, the title and the like. Further, in many cases, a nickname is attached next to the sender's email address. In order to decode the nickname in the receiver system, encoding information is necessarily attached thereto. This information can be used to infer the language used by the recipient.

Regular business hours are generally consistent throughout each country, and thus business hour information can be exploited to obtain information about the author of an email. Through the 'Date' field, it is possible to find which campaign the attack was a part of. Unlike traditional weapons, cyber-attack weapons are instantly neutralized when a respondent analyzes and prepares a response thereto, and immediately lose their effectiveness as an APT attack. In order to evade detection and reduce the possibility of being neutralized, the attack is carried out in a short period of time, and this attack period is called a campaign. Since the 'Date' field indicates the date that the email is sent, the 'Date' field can be used to classify the authors by campaign. Also, with the 'Date' field, it is possible to determine the holidays of a specific country. In the case of APT attacks developed with support from a government agency, the development of the APT attacks will likely be carried out systematically during regular business hours, and thus it is highly likely that the attackers will not work on national holidays. Further, time information is also included in the 'Date' field, and it is possible to figure out the work day and shift of the sender from the time information. It is also possible to identify the lunch time, the dinner time, the overtime, and so on. As a result of analyzing actual malicious attacks originating from particular countries, almost all activities were found to have been conducted during normal business hours associated with that particular country.

The email header may also include information about the sender's system. The 'User-Agent' field contains a lot of information about the system and program of a user, such as the type and version of the operation system, the type of web browser, the type of web browser engine, the type of CPU, the e-mail client program, and so on. By utilizing the 'User-Agent' field, the user's working environment can be identified. Therefore, this field is helpful in classifying users (authors). In addition, based on information about the software version and the CPU, additional information on when the hardware was purchased and the like can also be identified.

Referring back to FIG. 1, the information conversion unit 200 is configured to convert the feature field information extracted through the information analysis unit 100 into a feature data set for inputting into a learning model thereto. This process may include a post-process to apply the feature field information to a classification model algorithm.

The information conversion unit 200 may generate the feature data set by converting the feature field information extracted through the information analysis unit 100 into, e.g., categorical data or numerical data. A feature type 26 and a range 28 in which the feature field information is tabulated are shown in FIG. 2.

In the case of the 'Country' field, since the currently available number of countries is 195, it is processed into categorical data. The 'Latitude' field and the 'Longitude' field are used as numerical data to indicate the location accurately. In the case of the 'Time zone' field, it is processed into numerical data because a numerical comparison of longitude is possible. Time zones are extracted from each of the 'IP' field, the 'Received' field, and the 'Date' field. The 'Encoding' field, the 'Accept-language' field, and the 'Content-language' field are processed into categorical data like the 'Country' field. The 'Charset' field, extracted from each of the 'From' field, the 'Subject' field, and the 'Received' field, is also processed into categorical data. In the case of the 'Date' field, values therein are converted into integers and processed into numerical data.

The information can be reduced by classifying the converted values into weekday/weekend, business hours, hours worked, shift type and the like and processing the information into categorical data. In addition, it is possible to define the weekday/weekend, the business hours, the hours worked, and the shift type for each country to be used as features. This is illustrated in FIGS. 3 to 5.

The learning model unit 300 is configured to generate a classification model for classifying emails by author by applying a learning process (e.g., machine learning) the feature data sets that are converted by the information conversion unit 200. Here, the emails inputted to the email authorship classification apparatus 10 may be emails to use in, e.g., learning of the classification model. Therefore, the learning model unit 300 is trained with the feature data sets of the emails inputted to the email authorship classification apparatus 10 to generate the classification model.

Figure 6:
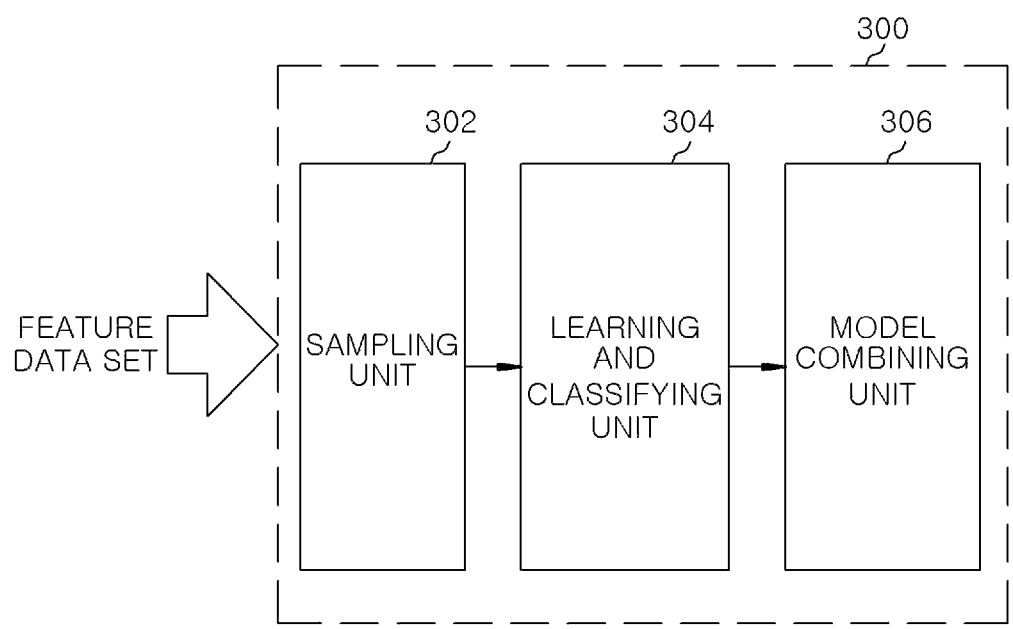
FIG. 6 shows a block diagram of a learning model unit shown in FIG. 1.

FIG. 6 shows an example of the learning model unit 300.

As shown in FIG. 6, the learning model unit 300 according to the embodiment of the present disclosure adopts a bagging classification learning model using, e.g., a bagging (bootstrap aggregating) algorithm and includes a sampling unit 302 configured to divide a feature data set into 'n' groups of samples; a learning and classifying unit 304 configured to generate 'n' number of classifiers by applying a learning algorithm to each of the 'n' groups of samples; and a model combining unit 306 configured to combine 'n' number of classifiers to generate a classification model.

The bagging classification learning model refers to a model that draws repeated samples of the same size from a given training data set by random sampling with replacement (i.e., bootstrap sampling) to generate classifiers for the respective samples, and makes a decision by combining the results of the generated classifiers. Bagging is an abbreviation for "bootstrap aggregating".

Meanwhile, the email authorship classification apparatus 10 according to the embodiment of the present disclosure may further include the author classification unit 12 configured to classify an author of an arbitrary email by applying the classification model of the learning model unit 300 to the email.

FIG. 7 is a flowchart illustrating an exemplary learning method for email authorship classification according to one embodiment of the present disclosure.

Hereinafter, descriptions will be made on the learning method according to the embodiment of the present disclosure. In step S100, the information analysis unit 100 analyzes one or more pieces of header field information in an attribute header of each email. In step S102, the information analysis unit 100 extracts one or more pieces of feature field information related to the authorship of each email from each of the one or more pieces of header field information. In step S104, the information conversion unit 200 converts the one or more pieces of the feature field information into a feature data set for inputting into a learning model thereto. In step S106, the learning model unit 300 is trained with the feature data set and generates a classification model for classifying the emails by author.

An authorship classification method according to one embodiment of the present disclosure classifies an author of an arbitrary email by applying the above-described classification model to the email.

As described above, according to the embodiment of the present disclosure, by analyzing the header of an email to classify a sender (an author) thereof, it is possible to perform rapid analysis of the email, and by extracting feature information, through which the author of the email can be identified, from the header of the email and applying the feature information to a classification learning algorithm, it is also possible to classify the author of the email efficiently even when the number of given emails is small or there are various pieces of feature information.

The combinations of respective sequences of a flow diagram attached herein may be carried out by computer program instructions. Since the computer program instructions may be executed by the processors of a general purpose computer, a special purpose computer, or other programmable data processing apparatus, the instructions, executed by the processor of the computer or other programmable data processing apparatus, create means for performing functions described in the respective sequences of the sequence diagram.

The computer program instructions, in order to implement functions in a specific manner, may be stored in a computer-useable storage medium or a computer-readable storage medium (or a memory) for a computer or other programmable data processing apparatus, and the instructions stored in the computer-useable storage medium or the computer-readable storage medium (or the memory) may produce manufacturing items including an instruction means for performing functions described in the respective sequences of the sequence diagram.

Further, the computer program instructions may be loaded in a computer or other programmable data processing apparatus, and therefore, the instructions, which are a series of sequences executed in a computer or other programmable data processing apparatus to create processes executed by a computer to operate a computer or other programmable data processing apparatus, may provide operations for executing functions described in the respective sequences of the flow diagram.

Moreover, the respective sequences may refer to two or more modules, segments, or codes including at least one executable instruction for executing a specific logical function(s). In some alternative embodiments, it is noted that the functions described in the sequences may be run out of order. For example, two consecutive sequences may be substantially executed simultaneously or often in reverse order according to the corresponding functions.

The above description illustrates the technical idea of the present disclosure, and it will be understood by those skilled in the art to which this present disclosure belongs that various changes and modifications may be made without departing from the scope of the essential characteristics of the present disclosure. Therefore, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

What is claimed is:

1. An apparatus for classifying an email authorship, the apparatus comprising:
    a memory that stores an email authorship classification program; and
    a processor configured to execute the email authorship classification program to control the memory,
    wherein the processor is further configured to:
    analyze one or more pieces of header field information in an attribute header of each of emails and extract one or more pieces of feature field information related to an authorship of each of the emails from each of the one or more pieces of header field information;
    convert the one or more pieces of the feature field information into a feature data set for inputting into a learning model thereto; and
    generate a classification model for classifying the emails by an author by applying a learning process to the feature data set,
    wherein the one or more pieces of the feature field information includes location information, language information, time information, and system information, and
    the classification model is trained using the location information, the language information, the time information, and the system information as input thereof to classify the emails by the author.

2. The apparatus of claim 1, wherein the processor is further configured to convert the one or more pieces of feature field information into categorical data or numerical data to generate the feature data set.

3. The apparatus of claim 1, wherein the location information is classified into at least one of country, latitude, longitude, and time zone,
    the language information is classified into at least one of encoding, accept-language, content-language, and charset, and
    the time information is classified into at least one of date, weekday/weekend, business hours, and shift type.

4. The apparatus of claim 1, wherein when the processor generates the classification model,
    the processor is configured to divide the feature data set into 'n' groups of samples,
    generate 'n' number of classifiers by applying a learning algorithm to each of the 'n' groups of samples, and
    combine the 'n' number of classifiers to generate the classification model.

5. The apparatus of claim 4, wherein the learning algorithm includes a bagging classification algorithm.

6. The apparatus of claim 1, wherein the processor is further configured to classify an author of a specific email by applying the classification model to the specific email.

7. A learning method of a learning apparatus for email authorship classification, the method comprising:
    analyzing one or more pieces of header field information in an attribute header of each of emails;
    extracting one or more pieces of feature field information related to an authorship of each of the emails from each of the one or more pieces of header field information;
    converting the one or more pieces of the feature field information into a feature data set for inputting into a learning model thereto; and
    generating a classification model for classifying the emails by an author by applying a learning process to the feature data set,
    wherein the one or more pieces of the feature field information includes location information, language information, time information, and system information, and
    the classification model is trained using the location information, the language information, the time information, and the system information as input thereof to classify the emails by the author.

8. The method of claim 7, wherein, in the converting, the feature data set is generated by converting the one or more pieces of feature field information into categorical data or numerical data to generate the feature data set.

9. The method of claim 7, wherein the location information is classified into at least one of country, latitude, longitude, and time zone,
    the language information is classified into at least one of encoding, accept-language, content-language, and charset, and
    the time information is classified into at least one of date, weekday/weekend, business hours, and shift type.

10. The method of claim 7, wherein the generating includes:
    dividing the feature data set into 'n' groups of samples;
    generating 'n' number of classifiers by applying a learning algorithm to each of the 'n' groups of samples; and
    generating a classification model by combining the 'n' number of classifiers.

11. The method of claim 10, wherein the learning algorithm includes a bagging classification algorithm.

12. The method of claim 7, further comprising classifying an author of a specific email by applying the classification model to the specific email.

13. A non-transitory computer-readable storage medium including computer-executable instructions, when executed by a processor, cause the processor to:
    analyze one or more pieces of header field information in an attribute header of each of emails;
    extract one or more pieces of feature field information related to an authorship of each of the emails from each of the one or more pieces of header field information;
    convert the one or more pieces of the feature field information into a feature data set for inputting a learning model thereto; and generate a classification model for classifying the emails by an author by applying a learning process to the feature data set, wherein the one or more pieces of the feature field information includes location information, language information, time information, and system information, and the classification model is trained using the location information, the language information, the time information, and the system information as input to classify the emails by the author.

* * * * *